United States Patent
Mizukura

(10) Patent No.: US 9,789,760 B2
(45) Date of Patent: Oct. 17, 2017

(54) FUEL TANK STRUCTURE FOR SADDLE-RIDE TYPE VEHICLE

(71) Applicant: HONDA MOTOR CO., LTD., Tokyo (JP)

(72) Inventor: Yuki Mizukura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 98 days.

(21) Appl. No.: 14/754,074

(22) Filed: Jun. 29, 2015

(65) Prior Publication Data
US 2016/0001652 A1    Jan. 7, 2016

(30) Foreign Application Priority Data
Jul. 4, 2014    (JP) .................................. 2014-138998

(51) Int. Cl.
| | | |
|---|---|---|
| *B60K 15/04* | (2006.01) | |
| *B60K 15/073* | (2006.01) | |
| *B62J 35/00* | (2006.01) | |
| *B60K 15/03* | (2006.01) | |

(52) U.S. Cl.
CPC .......... *B60K 15/0406* (2013.01); *B60K 15/04* (2013.01); *B60K 15/073* (2013.01); *B62J 35/00* (2013.01); *B60K 2015/03296* (2013.01); *B60K 2015/0432* (2013.01); *B60K 2015/0458* (2013.01); *B60K 2015/0474* (2013.01); *B60K 2015/0487* (2013.01); *B60K 2015/0496* (2013.01); *B60Y 2200/12* (2013.01)

(58) Field of Classification Search
CPC .. B60K 15/04; B60K 15/0406; B60K 15/073; B60K 2015/03296; B60K 2015/0432; B60K 2015/0458; B60K 2015/0474; B60K 2015/0487; B60K 2015/0496; B62J 35/00
USPC ......................................................... 220/562
See application file for complete search history.

(56) References Cited

U.S. PATENT DOCUMENTS

| 6,033,006 A | * | 3/2000 | Bovellan ................ | B60K 15/04 220/86.2 |
|---|---|---|---|---|
| 2002/0033201 A1 | * | 3/2002 | Miura .................... | B60K 15/04 141/390 |

FOREIGN PATENT DOCUMENTS

JP    10-236366 A    9/1998

* cited by examiner

*Primary Examiner* — Andrew Perreault
(74) *Attorney, Agent, or Firm* — Brich, Stewart, Kolasch & Birch, LLP

(57) ABSTRACT

A fuel tank structure for a saddle-ride vehicle for discharging fuel leaking out from a filler neck between a cover member and a fuel tank. The fuel tank structure includes a filler neck having a collar portion projecting upwardly from an upper surface of a fuel tank with a tank cap to seal the filler neck. A tank cover includes a cover opening portion into which the collar portion is inserted for covering the circumference of the filler neck. The tank cap has an extending wall portion for surrounding the outside of the collar portion and extending to a position below the cover opening portion so that fuel leaking from the filler neck is discharged through a clearance between the fuel tank and the tank cover.

13 Claims, 4 Drawing Sheets

FUEL TANK STRUCTURE FOR SADDLE-RIDE TYPE VEHICLE

CROSS-REFERENCE TO RELATED APPLICATIONS

The present application claims priority under 35 USC 119 to Japanese Patent Application No. 2014-138998 filed Jul. 4, 2014 the entire contents of which are hereby incorporated by reference.

BACKGROUND OF THE INVENTION

1. Field of the Invention

The present invention relates to a fuel tank structure for a saddle-ride type vehicle.

2. Description of Background Art

In order to limit the discharge of vaporized fuel in the fuel tank toward the outside of the tank, fuel tanks have heretofore been increased and are designed not to release tank inner pressure to the atmosphere when pressure in the fuel tank is equal to or lower than a predetermined pressure.

In this case, although the pressure in the fuel tank is equal to or lower than the predetermined pressure, a certain level of pressure is released from around a tank cap when a filler neck of the fuel tank is opened. Therefore, a quantity of fuel may possibly leak out from the filler neck.

On the other hand, Japanese Patent Laid-Open No. Hei 10-236366 discloses the structure wherein a cover member covers the periphery of a filler neck of a fuel tank of a saddle-ride type vehicle to make the upwardly projection of a tank cap inconspicuous. In addition, a passage for discharging downwardly the fuel and the like coming from a breathing hole provided in the tank cap is formed by a gap between the upper surface of the fuel tank and the cover member.

In this case, the tank cap has a second seal member for closing the gap between the outer circumferential portion of the tank cap and the cover member in addition to a first seal member for closing the filler neck. The second seal member is designed to efficiently lead the fuel leaking from the filler neck to the gap between the cover member and the fuel tank for discharge.

The second seal member for closing the gap between the tank cap and the cover member is provided in addition to the first seal member for closing the filler neck as in the above conventional technology. In such a case, however, there is a problem in that it is necessary to set tightening margins, loads and the like accurately so as to allow both the seal members to function appropriately, which easily leads to an increase in the cost.

SUMMARY AND OBJECTS OF THE INVENTION

Accordingly, an object of an embodiment of the present invention is to provide a fuel tank structure for a saddle-ride type vehicle in which fuel leaking out from a filler neck is led between a cover member and a fuel tank for discharge. In this way, the cost of manufacturing can be controlled.

As means for solving the above problem, according to an embodiment of the present invention, a fuel tank structure for a saddle-ride type vehicle includes a filler neck (40) having a tube portion (41) projecting upwardly from an upper surface of a fuel tank (21) with a tank cap (50) adapted to seal the filler neck (40) and exposed to the exterior appearance of the vehicle. A cover member (22) includes an opening portion (65) into which the tube portion (41) is inserted for covering the circumference of the filler neck (40). The tank cap (50) has an extending wall portion (51c) surrounding an outside of the tube portion (41) and extending to a position below the opening portion (65) wherein fuel leaking from the filler neck (40) is discharged through a first passage (22d) between the fuel tank (21) and the cover member (22).

In addition, the saddle-ride type vehicle includes the entire vehicles on which an operator rides while straddling the vehicle body. The saddle-ride type vehicle includes not only motorcycles (including motorized bicycles and scooter-type vehicles) but three-wheeled vehicles (including vehicles having one front wheel and two rear wheels and vehicles having two front wheels and one rear wheel) as well as four-wheeled vehicles.

According to an embodiment of the present invention, a second passage (68b) opening upwardly is provided between the extending wall portion (51c) and the opening portion (65).

According to an embodiment of the present invention, the tank cap (50) has an eave portion (51d) covering the second passage (68b) from above.

According to an embodiment of the present invention, the eave portion (51d) defines an expansion chamber (51e) opening downwardly with gas passing through the second passage (68b) being led into the expansion chamber (51e).

According to an embodiment of the present invention, the tank cap (50) includes a pressure-adjusting mechanism (64B), the pressure-adjusting mechanism (64B) including a breathing passage (64) capable of communication between the inside and outside of the fuel tank (21). Communication valves (57B, 61B) are provided for switching the breathing passage (64) between a communication state and an interrupt state. An outlet (54a) of the breathing passage (64) to the outside of the fuel tank (21) is disposed inside the extending wall portion (51c).

According to an embodiment of the present invention, an outside-cap outflow passage (68a) opening downwardly is provided between the tube portion (41) and the extending wall portion (51c). The cover member (22) protrudes around the tube portion (41) to define an in-cover expansion chamber (67), into which the gas passing through the outside-cap outflow passage (68a) is led.

According to an embodiment of the present invention, the tank cap (50) is screwed to a thread portion (42e) provided on an inside surface of the tube portion (41) and the thread portion (42e) is at least partially located below the opening portion (65).

According to an embodiment of the present invention, even if gas containing vaporized gas (hereinafter referred to as the fuel gas) leaks out when the filler neck is opened, the fuel gas is prevented by the extending wall portion from directly flowing out above the filler neck. Therefore, the fuel leaking out from the filler neck can be efficiently led to the first passage between the fuel tank and the cover member. In this way, the relatively simple and inexpensive structure in which the tank cap is provided with the extending wall portion surrounding the filler neck (tube portion) can lead the fuel leaking out from the filler neck to a portion between the cover member and the fuel tank for discharge. Thus, the structure can prevent the fouling of the exterior appearance portion resulting from the leaking fuel.

According to an embodiment of the present invention, the fuel gas leaks out from the filler neck and flows downwardly inside the extending wall portion and then the heavy liquid phase in the fuel gas flows downwardly as it is and passes through the first passage between the cover member and the fuel tank. On the other hand, air present in the first passage from the beginning and a portion of the light gaseous phase in the fuel gas go upwardly from the second passage between the extending wall portion and the opening portion. In this way, while preventing the fuel leaking out from the filler neck from fouling the exterior appearance portion, the vibration and noise of the cover member can be controlled resulting from the increased inner pressure caused by the fuel gas furiously flowing into the first passage between the cover member and the fuel tank.

According to an embodiment of the present invention, water, foreign matter or the like can be prevented from entering the first passage between the cover member and the fuel tank from the second passage opening upwardly.

According to an embodiment of the present invention, the noise resulting from the blowing of the gas passing through the second passage between the extending wall portion and the opening portion can be controlled. Thus, gas can be prevented from blowing toward the outside of the cover member at a burst to foul the circumference thereof.

According to an embodiment of the present invention, also if the communication valves bring the breathing passage into the communication state, the fuel gas going toward the outside of the tank from the passage opening portion of the breathing passage which communicates with the outside of the tank can be effectively led to the first passage between the cover member and the fuel tank by the extending wall portion.

According to an embodiment of the present invention, the vibration and noise of the cover member caused by the gas reaching between the fuel tank and the cover member can be controlled.

According to an embodiment of the present invention, the thread portion is placed at a low position; therefore, the length of the tube portion can be restricted to the minimum. In addition, while ensuring the opening area of the filler neck, the opening area of the opening portion can be reduced compared with the case where the thread portion is provided on the outside lateral surface of the tube portion.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
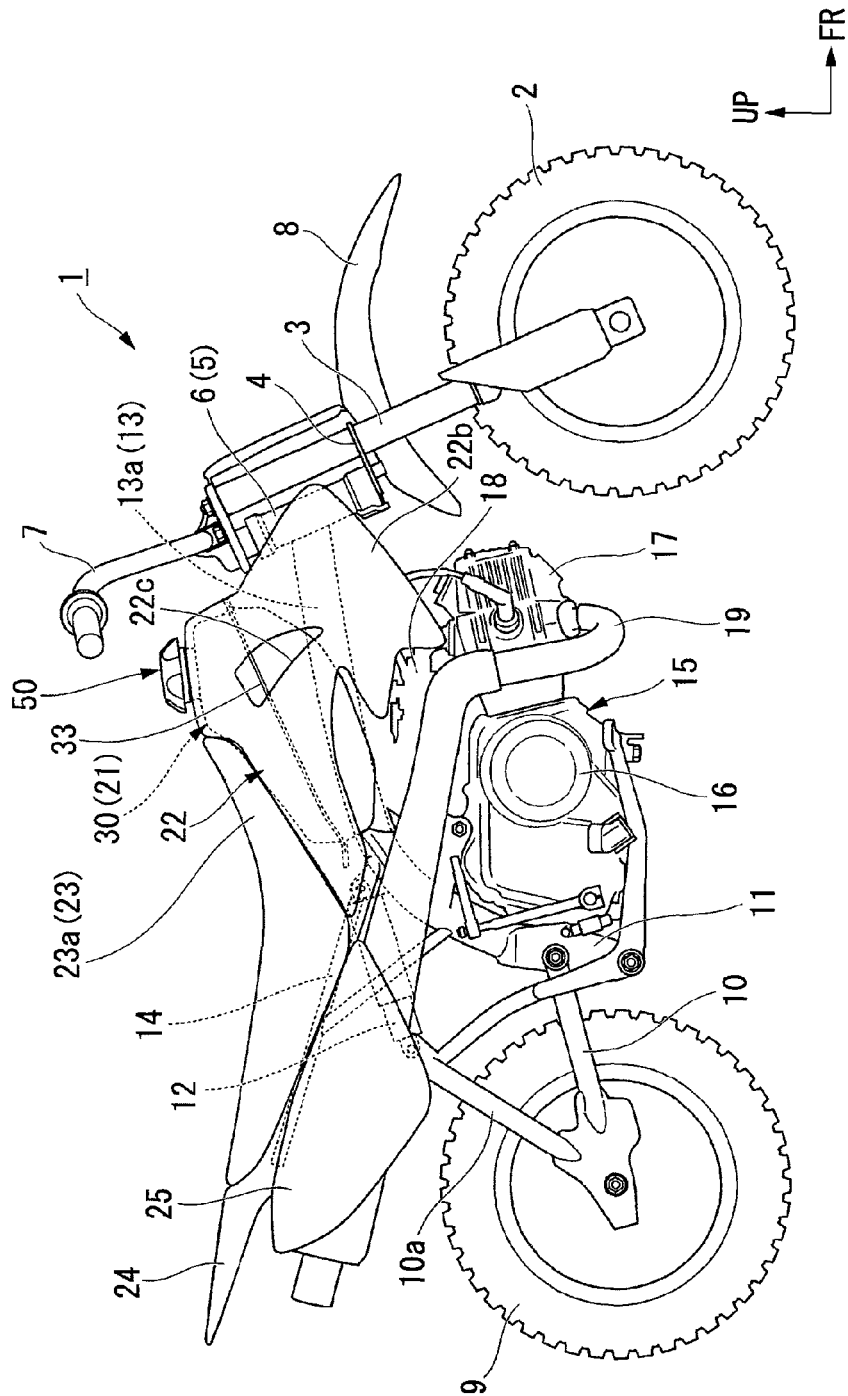
FIG. 1 is a right lateral view of a motorcycle according to an embodiment of the present invention.

An embodiment of the present invention will hereinafter be described with reference to the drawings. The directions such as front, rear, left, right and the like in the following description are the same as those of a vehicle described below unless otherwise noted. In addition, arrow FR denoting the front of the vehicle, arrow LH denoting the left of the vehicle and arrow UP denoting the upper side of the vehicle are shown in place in the drawings used for the following description.

FIG. 1 illustrates a motorcycle 1 as a saddle-ride type vehicle of the present embodiment.

A front wheel 2 of the motorcycle 1 is rotatably supported by lower end portions of left and right front forks 3. The left and right front forks 3 are pivotally supported at upper portions thereof in a steerable manner by a head pipe 6 at a front end portion of a body frame 5 via a steering stem 4. Handlebars 7 are attached above the steering stem 4. A front fender 8 is attached below the steering stem 4.

A rear wheel 9 of the motorcycle 1 is rotatably supported by a rear end portion of a swing arm 10. The swing arm 10 extends anteroposteriorly at a position on the lower side of a rear portion of the vehicle body. The swing arm 10 is pivotally supported at a front end portion thereof in a vertically swingable manner by a pivot portion 11 on the rear side of a lower portion of the body frame 5. A cantilever 11a extends upwardly and forward from the rear end portion of the swing arm 10. A rear shock absorber 12 is interposed between an upper front end portion of the cantilever 11a and an upper portion of the body frame 5.

The body frame 5 includes a main frame 13 and a seat frame 14. The main frame 13 extends rearwardly from the head pipe 6 and reaches the pivot portion 11. The seat frame 14 extends rearwardly from a rear portion of the main frame 13. The main frame 13 is slightly inclined rearwardly and downwardly from the head pipe 6 and extends rearwardly (this extended portion is referred to as a rearward extending portion 13a). Then, the main frame 13 is bent downwardly and reaches the pivot portion 11. An engine 15, which is a prime mover of the motorcycle 1, is suspended below the main frame 13. The engine 15 is configured such that a cylinder 17 is raised slightly upwardly and forward (substantially horizontally) from a front end portion of a crankcase 16. An intake-system component 18 is connected to an upper portion of the cylinder 17. An exhaust-system component 19 is connected to a lower portion of the cylinder 17.

A fuel tank 21 for the engine 15 is supported above the rearward extending portion 13a of the main frame 13. The fuel tank 21 is covered by a tank cover (shroud) 22. A seat 23 supported by the seat frame 14 is disposed behind the fuel tank 21. The seat 23 has a front portion, which extends upwardly and forward and is referred to as a forward extending portion 23a. The forward extending portion 23a is supported by the upper side of a rear portion of the fuel tank 21. A rear fender 24 is disposed rearwardly of the seat 23. A side cover 25 is disposed below both sides of a rear portion of the seat 23.

Figure 2:
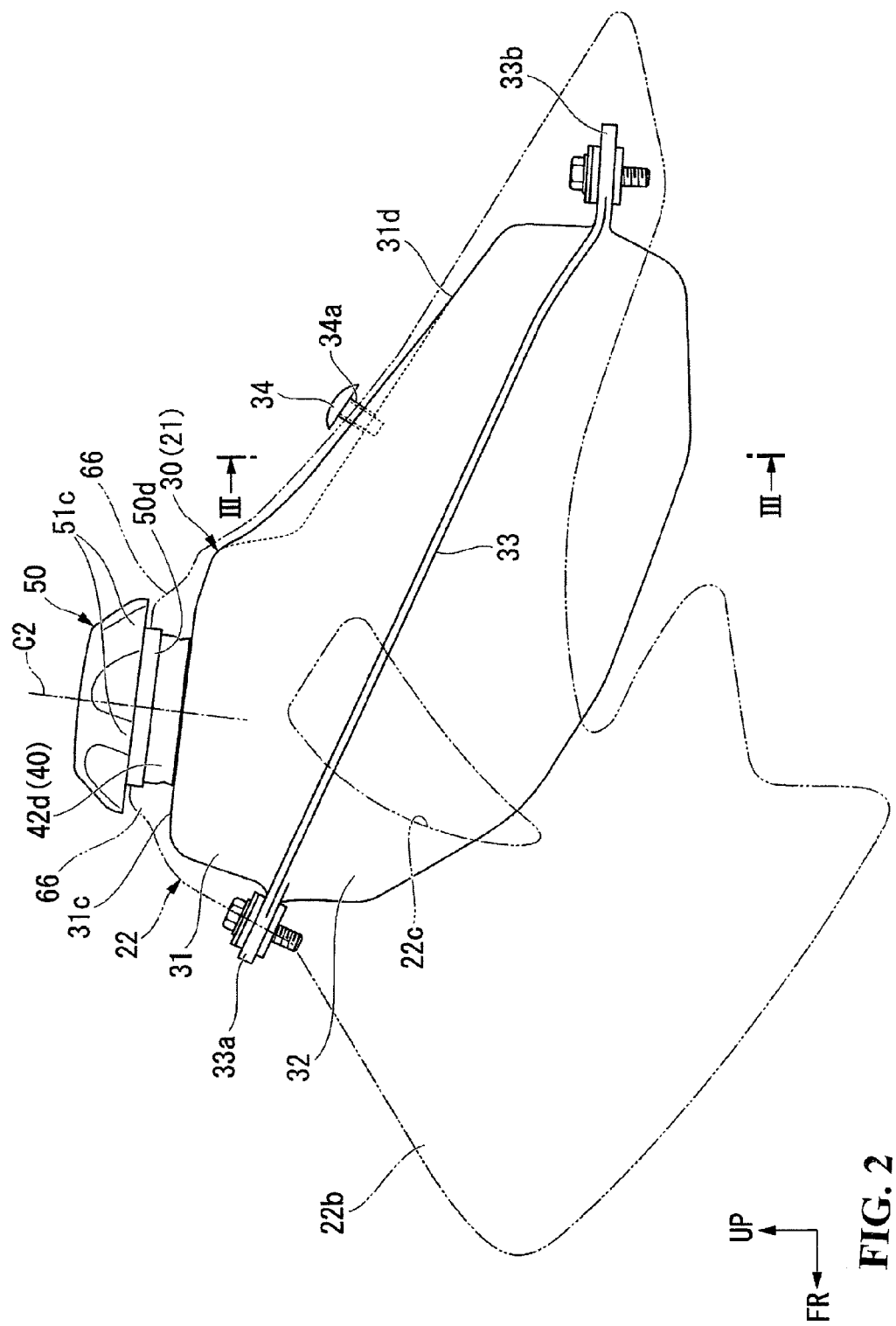
FIG. 2 is a left lateral view of a fuel tank of the motorcycle.

Referring to FIG. 2, the fuel tank 21 has a filler neck 40 at an upper end portion of a hollow tank main body 30. The filler neck 40 is opened and closed by a tank cap 50. The tank main body 30 is a blow molded product made of e.g. high-density polyethylene. A bead 33 extending along a parting line encountered during the molding is formed at the outer circumference of a vertical intermediate portion of the tank main body 30. The bead 33 linearly extends rearwardly and downwardly as viewed from a side. The tank main body 30 extends along a length direction of the bead 33 as viewed from the side. The tank main body 30 is formed with a flat portion 31c extending slightly rearwardly and downwardly at an upper end of a front portion of the tank main body 30.

Figure 4:
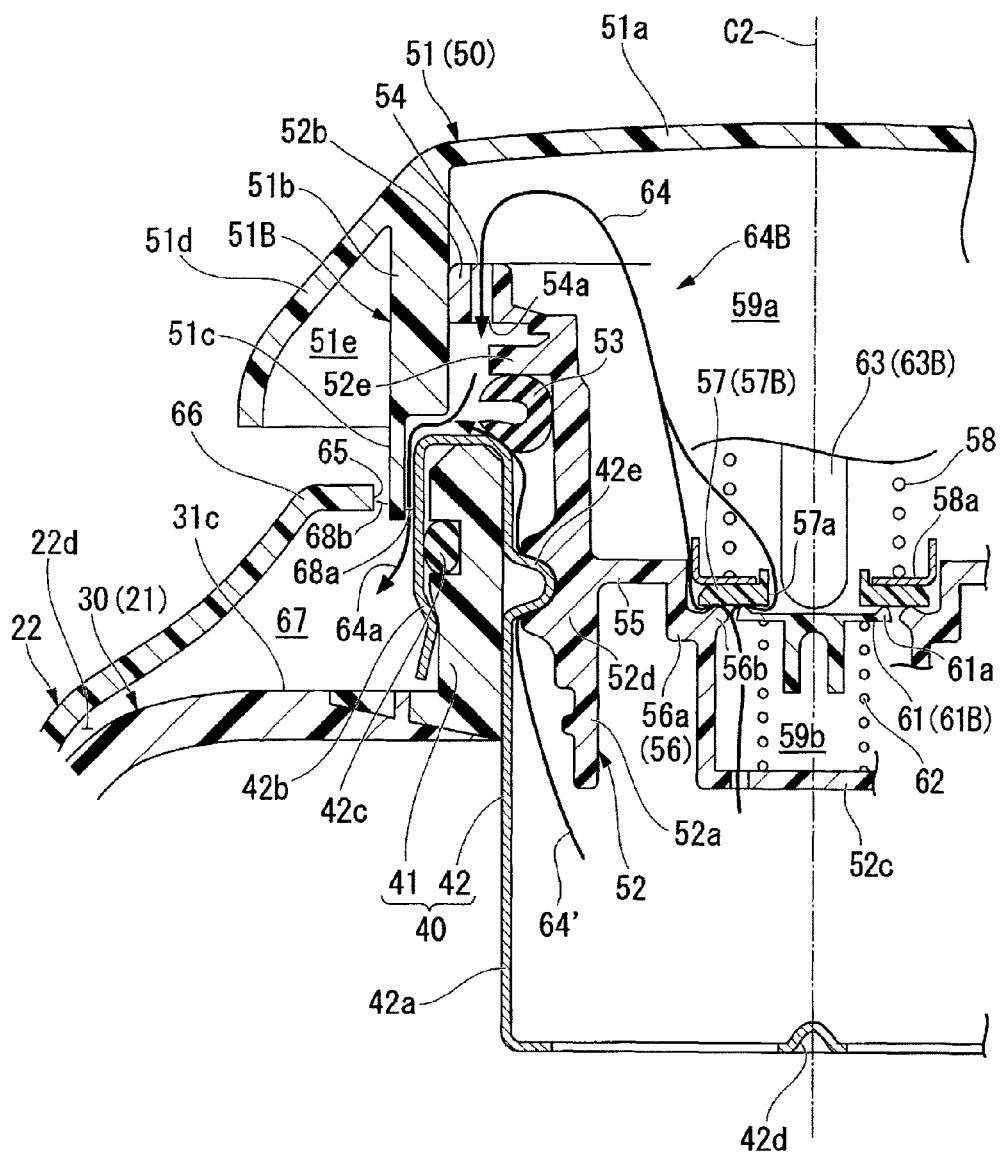
FIG. 4 is a cross-sectional view of a filler neck of the fuel tank with respect to the left-right center of a vehicle body.

As illustrated in FIG. 4, a cylindrical collar portion (filler) 41 is provided at the center of the flat portion 31c so as to be erected generally perpendicularly to the flat portion 31c. A metallic oil-filling guide tube 42 is mounted to the collar portion 41 to constitute the filler neck 40 of the tank main body 30. The collar portion 41 is integrated by inserting a previously molded resin component into the tank main body 30 during the blow molding of the tank main body 30.

Referring to FIG. 2, the tank main body 30 is formed so as to be stepwise recessed at a position rearward of the flat portion 31c. A rear inclined portion 31d extending rearwardly and downwardly is formed at an upper end of a rear portion of the tank main body 30. The rear inclined portion 31d is formed more inclined than the flat portion 31c. A so-called truss screw 34 with a large-diameter head is fixedly fastened to the center of the rear inclined portion 31d via a collar 34a. The truss screw 34 and the collar 34a function as a seat-front locking portion which locks a bottom plate of the forward extending portion 23a of the seat 23.

At front and rear end portions of the tank main body 30 the bead 33 extends forward and rearwardly to form front and rear mount portions 33a and 33b. The front and rear mount portions 33a and 33b are supported by the body frame 5 via rubber bushes. In left and right side portions of the tank main body 30, cover locking portions 33c are formed at anteroposteriorly intermediate portions of the bead 33. The cover locking portions 33c are adapted to lock locking claws 22a on an inside surface of the tank cover 22 (see FIG. 3).

Figure 3:
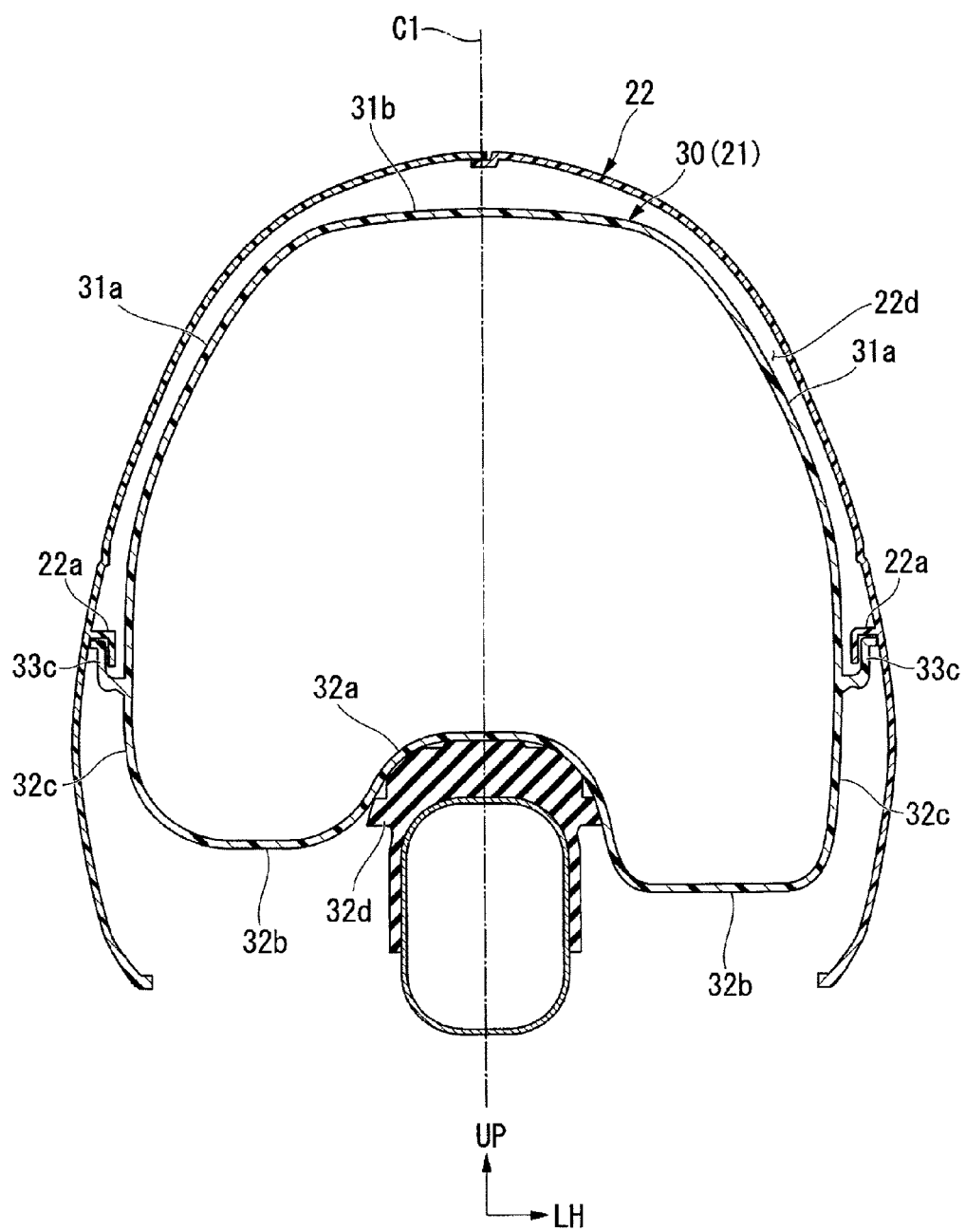
FIG. 3 is a cross-sectional view taken along line III-III in FIG. 2.

With additional reference to FIG. 3, the tank main body 30 is formed in a saddle shape to straddle left and right the main frame 13, which is shaped, for example, like a rectangular pipe having rounds at its four corners. The tank main body 30 is formed generally symmetric with respect to the left-right center of the vehicle body. Line C1 in FIG. 3 denotes a left-right centerline of the vehicle body.

A lower half-body 32 of the tank main body 30 below the bead 33 has a saddle-shape portion 32a, left and right bottom portions 32b, and left and right lower outside portions 32c. The saddle-shape portion 32a straddles an upper portion of the main frame 13 with a gap defined therebetween. The left and right bottom portions 32b extend left and right outward from left and right outside ends of the saddle-shape portion 32a via left and right inner curved portions. The left and right lower outside portions 32c extend upwardly from left and right outside ends of the left and right bottom portions 32b via left and right outer curved portions and reach the bead 33. The left bottom portion 32b is displaced more downwardly than the right bottom portion 32b to form the lowest end of the tank. A fuel pump not shown is installed below the left bottom portion 32b. The saddle-shape portion 32a is supported by the main frame 13 via a mount rubber 32d attached to the main frame 13.

An upper half-body 31 of the tank main body 30 above the bead 33 has left and right upper outside portions 31a and a top portion 31b. The left and right upper outside portions 31 are inclined above the bead 33 so as to be located on the more left and right inner side as they go upwardly and are formed in such a curved shape as to project outward of the tank. The top portion 31b is spanned between upper ends of the left and right upper outside portions 31a. The top portion 31b is formed with the flat portion 31c and the rear inclined portion 31d.

The tank cover 22 covers the tank main body 30 from an upper portion to left and right side portions thereof with an appropriate clearance 22d defined therebetween. The tank cover 22 has left and right extending portions 22b which extend forward with respect to the tank main body 30 while being widened toward the end. The tank cover 22 is an external component exposed to the external appearance of the motorcycle 1. For example, the tank cover 22 is formed of a synthetic resin such as polypropylene, an ABS resin or the like. The tank cover 22 is formed generally symmetrical with respect to the left-right center of the vehicle body. The tank cover 22 is configured to be divided left and right with respect to the left-right center of the vehicle body. Left and right side portions of the tank cover 22 are formed with side openings 22c adapted to discharge part of the flow of air entering between the left and right extending portions 22b. The bead 33 of the tank main body 30 is partly visible through the side openings 22c.

Referring to FIG. 4, the oil-filling guide tube 42 of the filler neck 40 is formed cylindrical and coaxial with the collar portion 41. The oil-filling guide tube 42 has a guide tube main body 42a internally fitted to the collar portion 41 and a clip portion 42b which is folded from an upper end of the guide tube main body 42 toward the outer circumferential side thereof and is externally fitted to the collar portion 41. The oil-filling guide tube 42 is secured to the collar portion 41 by caulking the clip portion 42b. An O-ring 42c, which is fitted to and held by an outer circumferential side groove of the collar portion 41, is in close contact with an inner circumferential surface of the clip portion 42b. The guide tube main body 42a extends inwardly of the tank with respect to the flat portion 31c of the tank main body 30 to form a lower end portion. In addition, a rod-like gun stopper 42d for restricting an insertion amount of an oil feed gun is integrally formed on (or integrally secured to) the lower end portion of the guide tube main body 42a.

A thread portion 42e, which is formed like a V-shape in cross-section and extends in a spiral manner, is provided to project from a portion of the guide tube main body 42a located on the inner circumference of the collar portion 41. The tank cap 50 is operatively turned around a central axis C2 of the oil-filling guide tube 42 and thus of the filler neck 40 to be attached to or detached from the filler neck 40. The central axis C2 of the filler neck 40 is located on the left-right center of the vehicle body.

The tank cap 50 has a grip portion 51 and a screwing-up portion 52. The grip portion 51 is located as a turn-operation portion outside the tank cover 22 and exposed to the exterior appearance of the vehicle. The screwing-up portion 50 enters the inside of the filler neck 40 on the inner side of the grip portion 51. The constituent components of the tank cap 50 shall be made of a synthetic resin with high oil resistance unless otherwise noted.

The grip portion 51 is formed with recesses and projections on the outer circumferential portion so as to form, for example, a general star-shape as viewed from a direction of the central axis C2. The grip portion 51 has an upper wall portion 51a, a cylindrical outer circumferential wall portion 51b and a projecting wall portion 51d. The upper wall portion 51a is generally perpendicular to the central axis C2. The outer circumferential wall portion 51b extends along the central axis C2 from an outer circumferential edge of the upper wall portion 51a toward the tank main body 30. The projecting wall portion 51d extends while being widened toward the end with respect to the outer circumferential wall portion 51b from the outer circumferential edge of the upper wall portion 51a toward the tank main body 30 so as to form a projecting shape on the outer circumference of the grip portion 51.

The outer circumferential wall portion 51b is formed relatively thick. An upper end enlarged-diameter portion 52b at an upper end of the screwing-up portion 52b is internally fitted and secured to the inside of the outer circumferential wall portion 51b. An extending wall portion 51c to be inserted into a cover opening portion 65, described later, extends from a lower end of the outer circumferential wall portion 51b. The extending wall portion 51c is formed relatively thin by reducing the thickness of the outer circumferential wall portion 51b from the inside thereof. Hereinafter, the outer circumferential wall portion 51b and the extending wall portion 51c are combined to constitute an outer tube portion 51B. The projecting wall portion 51d defines an inner space 51e opening downwardly.

The screwing-up portion 52 is disposed on the inner circumferential side of the outer circumferential wall portion 51b of the grip portion 51 so as to be spaced apart therefrom. The screwing-up portion 52 includes a cylindrical inner circumferential wall portion 52a extending along the central axis C2, an upper end enlarged-diameter portion 52b formed at an upper end portion of the inner circumferential wall portion 52a so as to have an enlarged diameter, and a valve holding portion 52c holding a valve body on the inner circumferential side of the inner circumferential wall portion 52a.

The inner circumferential wall portion 52a has, on the outer circumference of a vertically intermediate portion, a thread-formed portion 52d to be screwed to the thread portion 42e of the oil-filling guide tube 42. An outer flange wall 52e is provided on the outer circumference of an upper portion of the inner circumferential wall portion 52a so as to project therefrom. An annular seal 53 formed into a C-shape in cross-section and externally attached to the inner circumferential wall portion 52a is disposed below the outer flange wall 52e. The annular seal 53 is held between and in close contact with a lower surface of the outer flange wall 52e and a circumferential edge of an upper opening of the filler neck 40 (oil-filling guide tube 42) in a state where the filler neck 40 is closed by the tank cap 50.

The upper end enlarged-diameter portion 52b is firmly fixed on an outer circumferential surface thereof to an inner circumferential surface of the outer circumferential wall of the grip portion 51. The upper end enlarged-diameter portion 52b is formed into a rectangle in cross-section and extends annularly. The upper end enlarged-diameter portion 52b is formed with a plurality of breathing holes 54 parallel to the central axis C2.

The valve holding portion 52c includes an inner flange wall 55 located on the inner circumference of the thread-formed portion 52d and a bottomed cylindrical valve body housing portion 56 connected at an upper end thereof to an inner circumferential end of the inner flange wall 55.

The valve body housing portion 56 is formed at an upper portion thereof with an upper enlarged-diameter portion 56a stepwise increased in diameter. The upper enlarged-diameter portion 56a is formed on an inner circumferential side thereof with a first seat portion 56b with which a first valve body 57 is brought into contact from above. The first valve body 57 is formed like a disk generally perpendicular to the central axis C2 and is made of an elastic material such as rubber at least on the lower surface side thereof. A first coil spring 58 has a lower end that comes into contact with an upper surface of the first valve body 57 via a metallic retainer 58a.

In this way, the first valve body 57 is biased downwardly to come into close contact with the first seat portion 56b from above to interrupt the communication between a space (hereinafter, referred to as a valve-underside space 59b) below the first valve body 57 and a space (hereinafter, referred to as a valve-upside space 59a) above the first valve body 57. If the first valve body 57 is moved upwardly against the biasing force of the first coil spring 58 to be away from the first seat portion 56b, communication is established between the valve-underside space 59b and the valve-upside space 59a. The valve-underside space 59b communicates with the space in the tank and the valve-upside space 59a communicates with the space outside the tank via the breathing holes 54 and the like. In other words, the first valve body 57 and the first seat portion 56b constitute a first communication valve 57B which switches the communication and the interrupt between the inside and outside of the tank. The first communication valve 57B functions as a positive pressure adjusting valve which is opened when the inner pressure of the fuel tank 21 becomes equal to or greater than a predetermined pressure.

The first valve body 57 has at its central portion an opening 57a which is closed by a second valve body 61. The second valve body 61 is located on the inner circumferential side of the first seat portion 56b and is formed like a disk generally perpendicular to the central axis C2. A second seat portion 61a, which comes into contact with the first valve body 57 from below, is formed on the upper surface side of an outer circumferential portion of the second valve body 61. A second coil spring 62, which biases the second valve body 61 upwardly, comes into contact with a lower surface of the second valve body 61 at its upper end.

In this way, the second valve body 61 is biased upwardly to bring the second seat portion 61a into close contact with the lower surface side of the first valve body 57 from below, thereby interrupting the communication between the valve-underside space 59b below the second valve body 61 and the valve-upside space 59a above the second valve body 61. If the second valve body 61 is moved downwardly against the biasing force of the second coil spring 62 to be away from the first valve body 57, communication is established between the valve-underside space 59b and the valve-upside space 59a. In other words, the second valve body 61 and the first valve body 57 constitute a second communication valve 61B which switches the communication and interrupt between the inside and outside of the tank. The second communication valve 61B functions as a negative pressure adjusting valve which is opened when the inner pressure of the fuel tank 21 becomes equal to or lower than a predetermined pressure.

A push rod 63 of a valve-opening mechanism 63B has a lower end portion disposed in the opening 57a of the first valve body 57. The valve-opening mechanism 63B moves the push rod 63 downwardly through a predetermined operation for the tank cap 50 to open the second communication valve 61B for communication between the inside and outside of the tank. In this way, the space inside the tank can be previously brought to atmospheric pressure before the filler neck 50 is opened. In addition, the predetermined operation includes, for example, a turning operation of the grip portion 51 encountered when the filler neck 40 is opened, and an operation of a depressing portion for directly depressing the push rod 63. If the tank cap 50 has a key cylinder, the valve-opening mechanism 63B may be operated in conjunction with the operation of the key cylinder.

A breathing passage 64 (denoted by an arrow in the FIG. 4) for establishing communication between the inside and outside of the tank, when the first communication valve 57B and the second communication valve 61B are opened, is formed in the tank cap 50. The breathing passage 64 has the valve-downside space 59b and the valve-upside space 59a, and the breathing holes 54 formed in the upper end enlarged-diameter portion 52b of the screwing-up portion 52. The breathing holes 54 are located on the inner circumferential side of the outer circumferential wall. Fuel gas discharged from lower end openings 54a of the breathing holes 54 to the outside of the breathing passage 64 flows inside the outer tube portion 51B and below the upper end enlarged-diameter portion 52b. The first communication valve 57B and the second communication valve 61B, and the breathing passage 64 constitute a pressure-adjusting mechanism 64B for controlling the inner pressure of the tank main body 30.

The tank cover 22 is formed at an upper end portion thereof with the cover opening portion 65 which allows the filler neck 40 (collar portion 41) to pass therethrough. The circumference of the cover opening portion 65 is formed as a raised portion 66 that is raised more upwardly with respect to the flat portion 31c of the tank main body 30 as it goes toward the filler neck 40 (collar portion 41). The tank cover 22 is formed to have a generally uniform thickness. A filler neck outer circumferential space 67 is defined on the inner side of the raised portion 66 and between the tank main body 30 and the raised portion 66. The height of an upper end of the raised portion 66 is made almost the same as or slightly lower than that of an upper end of the collar portion 41. A generally uniform gap is defined between an outer circumferential surface of the upper end portion of the collar portion 41 and an inner circumferential surface of the cover opening portion 65 over the full circumference thereof. The extending wall portion 51c of the tank cap 50 in the state in which the filler neck 40 is closed enters this gap. In this case, the gap is partitioned into an inner gap 68a between an inner circumferential surface of the extending wall portion 51c and the outer circumferential surface of the upper end portion of the collar portion 41 and an outer gap 68b between an outer circumferential surface of the extending wall portion 51c and the inner circumferential surface of the cover opening portion 65.

The fuel gas that has been discharged from the lower end openings 54a of the breathing holes 54 to the outside of the breathing passage 64 flows on the inside of the outer tube portion 51B and below the upper end enlarged-diameter portion 52b. Then, the fuel gas does not flow on the inner circumferential side of the collar portion 41 sealed by the annular seal 53 but flows downwardly in the inner gap 68a on the outer circumferential side of the collar portion 41 and reaches the filler neck outer circumferential space 67 on the inside of the raised portion 66 (see arrow 64a in FIG. 4). This fuel gas mostly flows in the clearance 22d between the tank cover 22 and the tank main body 30 and is discharged below the tank cover 22. However, a partial gaseous phase flows from the outer gap 68b to the outside of the tank cover 22.

A description is next given of the operation of the present embodiment.

Vaporized fuel is first produced in the fuel tank 21 to increase tank inner pressure to a pressure higher than atmospheric pressure. In this state, if the force exerted by the tank inner pressure to move the first valve body 57 upwardly exceeds the biasing force of the first coil spring 58, the first communication valve 57B is opened to establish communication between the inside and outside of the tank. In this way, the fuel gas in the fuel tank 21 passes downwardly through the inner gap 68a on the outer circumference of the collar portion 41 from the breathing passage 64 and reaches the filler neck outer circumferential space 67 in the tank cover 22. The fuel gas mostly flows in the clearance 22d between the tank cover 22 and the tank main body 30 and is discharged below the tank cover 22. Thus, the fuel gas will not get the outer surface (exterior appearance) of the tank cover 22 dirty.

If predetermined operation such as loosing the screwing-up of the tank cap 50 is done in the above state, the valve-opening mechanism 63B opens the second communication valve 61B to establish the communication between the inside and outside of the tank. In this way, similarly to the above, the fuel gas in the fuel tank 21 reaches the filler neck outer circumferential space 67 in the tank cover 22, flows in the clearance 22d between the tank cover 22 and the tank main body 30 and is discharged below the tank cover 22.

In addition, the valve-opening mechanism 63B may not be provided. In such a case, if the screwing-up of the tank cap 50 is loosed, after the pressure contact (seal) of the annular seal 53 with the filler neck 40 is released, the fuel gas flows out from between the annular seal 53 and the filler neck 40 to the outside of the tank (inside the outer tube portion 51B and below the upper end enlarged-diameter portion 52b) (see arrow 64' in FIG. 4).

The filler neck outer circumferential space 67 has a volume greater than that of the inner gap 68a on the outer circumference of the collar portion 41. The fuel gas flowing into the filler neck outer circumferential space 67 from the inner gap 68a reduces internal energy due to expansion. This can prevent noise and vibration such as the chattering of the tank cover 22.

The fuel gas flowing out from the filler neck 40 flows downwardly in the inner gap 68a on the outer circumference of the color portion 41 and flows into the filler neck outer circumferential space 67. Then, the fuel gas partially flows upwardly in the outer gap 68b between the extending wall portion 51c and the cover opening portion 65 and flows out to the outside of the tank cover 22. In this case, a relatively heavy liquid phase (vaporized gas) in the fuel gas does not turn back upwardly in the filler neck outer circumferential space 67 but is discharged below the tank cover 22 through the inside of the tank cover 22. On the other hand, a relatively light gaseous phase in the fuel gas partially flows out toward the outside of the tank cover 22 from the outer gap 68b between the extending wall portion 51c and the cover opening portion 65. In other words, the filler neck outer circumferential space 67 is appropriately degassed. Therefore, the noise and vibration of the tank cover 22 is further prevented and fouling on the outer surface (external appearance) of the tank cover 22 can be prevented.

The projecting wall portion 51d of the tank cap 50 overhangs in an umbrella manner above the outer gap 68b between the extending wall portion 51c and the cover opening portion 65. Thus, raindrops, foreign matter or the like is prevented from entering the tank cover 22 from the outer gap 68b. The projecting wall portion 51d has a hollow shape opening downwardly. The inner space 51e of the projecting wall portion 51d has a volume greater than that of the outer gap 68b between the extending wall portion 51c and the cover opening portion 65. The inner space 51e of the projecting wall portion 51d functions as an expansion chamber similarly to the filler neck outer circumferential space 67. Gas outflow sound from the outer gap 68b or the like can thus be prevented.

As described above, the fuel tank structure for the saddle-ride type vehicle in the above embodiment includes the filler neck 40 having the collar portion 41 projecting upwardly from the upper surface of the fuel tank 21 with the tank cap 50 adapted to seal the filler neck 40 and being exposed to the exterior appearance of the vehicle. The tank cover 22 includes the cover opening portion 65 into which the collar portion 41 is inserted for covering the circumference of the filler neck 40. Fuel leaking from the filler neck 40 is discharged through the clearance 22d between the fuel tank 21 and the tank cover 22. The tank cap 50 includes the extending wall portion 51c that surrounds the outside of the collar portion 41 and extends to a position below the cover opening portion 65.

With this configuration, even if the fuel gas containing vaporized fuel leaks out when the filler neck 40 is opened, the direct outflow of the fuel gas above the filler neck 40 can be controlled by the extending wall portion 51c. Therefore, the fuel leaking out from the filler neck 40 is efficiently led to the clearance 22d between the fuel tank 21 and the tank cover 22. As described above, because of the relatively simple and inexpensive structure in which the tank cap 50 is provided with the extending wall portion 51c surrounding the filler neck 40 (collar portion 41), the fuel leaking out from the filler neck 40 can be led between the tank cover 22 and the fuel tank 21 for discharge. Thus, it is possible to prevent the leaking-out of fuel from fouling the exterior appearance portion.

The above fuel tank structure has the upwardly opening outer gap 68b provided between the extending wall portion 51c and the cover opening portion 65.

With this configuration, the fuel gas leaks out from the filler neck 40 and flows downwardly inside the extending wall portion 51c, and then the heavy liquid phase in the fuel gas flows downwardly as it is and passes through the clearance 22d between the tank cover 22 and the fuel tank 21. On the other hand, air that has been present in the clearance 22d from the beginning and a portion of the light gaseous phase in the fuel gas go upwardly through the outer gap 68b between the extending wall portion 51c and the cover opening portion 65. In this way, while preventing the fuel leaking out from the filler neck 40 from fouling the external appearance portion, the vibration and noise of the tank cover 22 resulting from the increased inner pressure caused by the fuel gas furiously flowing into the clearance 22d between the tank cover 22 and the fuel tank 21 can be controlled.

The above fuel tank structure is such that the tank cap 50 has the eave-like projecting wall portion 51d that covers the outer gap 68b from above.

This configuration can prevent water, foreign matter or the like from entering the clearance 22d between the tank cover 22 and the fuel tank 21 from the outer gap 68b opening upwardly.

The above fuel tank structure is such that the projecting wall portion 51d defines the inner space 51e opening downwardly. The gas passing through the outer gap 68b is led into the inner space 51e.

This configuration controls the noise resulting from the blowing of the gas passing through the outer gap 68b between the extending wall portion 51c and the cover opening portion 65. In addition, the configuration can prevent gas from blowing toward the outside of the tank cover 22 at a burst to foul the circumference thereof.

The above fuel tank structure is such that the tank cap 50 includes the pressure-adjusting mechanism 64B having the breathing passage 64 capable of communication between the inside and outside of the fuel tank 21 and the communication valves 57B and 61B switching the breathing passage 64 between the communication state and the interrupt state. The lower end opening 54a of the breathing passage 64 which communicates with the outside of the tank is located inside the extending wall portion 51c.

With this configuration, if the communication valves 57B and 61B bring the breathing passage 64 into the communication state, the fuel gas going toward the outside of the tank from the lower end opening 54a of the breathing passage 64 which communicates with the outside of the tank can be effectively led to the clearance 22d between the tank cover 22 and the fuel tank 21 by the extending wall portion 51c.

The above fuel tank structure is such that the inner gap 68a opening downwardly is provided between the collar portion 41 and the extending wall portion 51c and the tank cover 22 protrudes around the collar portion 41 to define the filler neck outer circumferential space 67, into which the gas passing through the inner gap 68a is led.

This configuration can control the vibration and noise of the tank cover 22 caused by the gas reaching between the fuel tank 21 and the tank cover 22.

In addition, the present invention is not limited to the above embodiment. For example, the tank main body may be made of metal such as a steel plate. The tank cap may not be of a screw type but may be of a bayonet type or of a hinge opening and closing type. The tank cover may not be left-right divided but may be vertically divided or may be of an integral type. The tank cover may not have the left and right extending portions. The extending wall portion of the tank cap needs only to extend to a position below at least the upper edge of the cover opening portion. If a portion between the tank cap and the cover member is closed by means of a seal as in conventional technology, the seal such as rubber which closes the second passage (68b) is needed only to be attached to the opening portion (65) side and to be brought into close contact with the extending wall portion (51c).

The saddle-ride type vehicle includes the entire vehicles on which an operator rides while straddling the vehicle body. The saddle-ride type vehicle includes not only motorcycles (including motorized bicycles and scooter-type vehicles) but three-wheeled vehicles (including vehicles having one front wheel and two rear wheels and vehicles having two front wheels and one rear wheel) as well as four-wheeled vehicles.

The configuration of the above embodiment is one example of the present invention. The configuration can be modified in various ways in a range not departing from the gist of the present invention, that is, the constituent elements of the embodiment may be replaced with the well-known constituent elements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A fuel tank structure for a saddle-ride vehicle, comprising:
   a tank body;
   a filler neck having a tube portion projecting upwardly from an upper surface of the tank body;
   a tank cap adapted to seal the filler neck, the tank cap having an upper wall portion and an extending wall portion extending downwardly from the upper wall portion;
   a cover member on the tank body; and an opening in the cover member, the tube portion extending upward through the opening,
wherein the tank cap includes a breathing passage capable of communication between inside and outside the tank body,
wherein an outlet of the breathing passage is disposed in the tank cap,
wherein the breathing passage extends through the outlet and between the extending wall portion and the tube portion, and
wherein the extending wall portion surrounds an outside of the tube portion and extends to a position below the opening wherein fuel leaking from the filler neck is discharged between the fuel tank and the cover member.

2. The fuel tank structure for a saddle-ride vehicle according to claim 1, wherein a passage opening is provided between the extending wall portion and the cover.

3. The fuel tank structure for a saddle-ride vehicle according to claim 2, wherein the tank cap has an eave portion covering the passage from above.

4. The fuel tank structure for a saddle-ride vehicle according to claim 3, wherein the eave portion defines an expansion chamber opening downwardly and gas passing through the passage is led into the expansion chamber.

5. The fuel tank structure for a saddle-ride vehicle according to claim 1, wherein an outside-cap outflow passage opening downwardly is provided between the tube portion and the extending wall portion, and
wherein the cover member protrudes around the tube portion to define an in-cover expansion chamber, into which gas passing through the outside-cap outflow passage is led.

6. The fuel tank structure for a saddle-ride vehicle according to claim 2, wherein an outside-cap outflow passage opening downwardly is provided between the tube portion and the extending wall portion, and
wherein the cover member protrudes around the tube portion to define an in-cover expansion chamber, into which gas passing through the outside-cap outflow passage is led.

7. The fuel tank structure for a saddle-ride vehicle according to claim 3, wherein an outside-cap outflow passage opening downwardly is provided between the tube portion and the extending wall portion, and
wherein the cover member protrudes around the tube portion to define an in-cover expansion chamber, into which gas passing through the outside-cap outflow passage is led.

8. The fuel tank structure for a saddle-ride vehicle according to claim 4, wherein an outside-cap outflow passage opening downwardly is provided between the tube portion and the extending wall portion, and
wherein the cover member protrudes around the tube portion to define an in-cover expansion chamber, into which gas passing through the outside-cap outflow passage is led.

9. The fuel tank structure for a saddle-ride vehicle according to claim 1, wherein the tank cap is screwed to a thread portion provided on an inside surface of the tube portion and the thread portion is at least partially located below the opening in the cover.

10. The fuel tank structure for a saddle-ride vehicle according to claim 2, wherein the tank cap is screwed to a thread portion provided on an inside surface of the tube portion and the thread portion is at least partially located below the opening in the cover.

11. The fuel tank structure for a saddle-ride vehicle according to claim 3, wherein the tank cap is screwed to a thread portion provided on an inside surface of the tube portion and the thread portion is at least partially located below the opening in the cover.

12. The fuel tank structure for a saddle-ride vehicle according to claim 4, wherein the tank cap is screwed to a thread portion provided on an inside surface of the tube portion and the thread portion is at least partially located below the opening in the cover.

13. The fuel tank structure for a saddle-ride vehicle according to claim 5, wherein the tank cap is screwed to a thread portion provided on an inside surface of the tube portion and the thread portion is at least partially located below the opening in the cover.

* * * * *